US009621202B2

United States Patent
van der Tang et al.

(10) Patent No.: US 9,621,202 B2
(45) Date of Patent: Apr. 11, 2017

(54) COMMON GATE MULTIPLE INPUT LOW NOISE AMPLIFIER

(71) Applicant: GREENPEAK TECHNOLOGIES B.V., Ultrecht (NL)

(72) Inventors: Johan David van der Tang, Zeist (NL); Anne Stellinga, Utrecht (NL)

(73) Assignee: GreenPeak Technologies B.V., Utrecht (NL)

( * ) Notice: Subject to any disclaimer, the term of this patent is extended or adjusted under 35 U.S.C. 154(b) by 0 days.

(21) Appl. No.: 15/104,872

(22) PCT Filed: Dec. 18, 2013

(86) PCT No.: PCT/NL2013/050919
§ 371 (c)(1),
(2) Date: Jun. 15, 2016

(87) PCT Pub. No.: WO2015/093936
PCT Pub. Date: Jun. 25, 2015

(65) Prior Publication Data
US 2016/0315643 A1    Oct. 27, 2016

(51) Int. Cl.
*H04B 17/02*    (2006.01)
*H04B 1/04*    (2006.01)
*H04B 1/00*    (2006.01)
*H04B 7/04*    (2017.01)
(Continued)

(52) U.S. Cl.
CPC ......... *H04B 1/0475* (2013.01); *H04B 1/0064* (2013.01); *H04B 7/04* (2013.01); *H04W 28/14* (2013.01); *H04B 7/0805* (2013.01); *H04B 7/0837* (2013.01)

(58) Field of Classification Search
CPC ...... H04B 1/0475; H04B 1/0064; H04B 7/04; H04B 7/0805; H04B 7/0837; H04W 28/14
See application file for complete search history.

(56) References Cited

U.S. PATENT DOCUMENTS 6,154,177 A * 11/2000 Saito ................ H01Q 1/243
343/702
7,796,952 B1    9/2010 Jin et al.
7,970,367 B1    6/2011 Groe
(Continued)

FOREIGN PATENT DOCUMENTS

WO    2009/093892 A1    7/2009

OTHER PUBLICATIONS

International Preliminary Report on Patentability for PCT/NL2013/050919, mailed Jun. 21, 2016, 6 pages.
(Continued)

*Primary Examiner* — Dac Ha
(74) *Attorney, Agent, or Firm* — Withrow & Terranova, P.L.L.C.

(57) ABSTRACT

Antenna diversity integrated circuit having two or more RF input connections for connecting an antenna (1a, 1b, 1c). A low noise amplifier circuit is present having a first stage (7a, 7b, 7c) for each one of the two or more RF input connections and a single second stage (8). Output connections of each of the first stages (7a, 7b, 7c) are combined in a single summing node to which an inductor (L) and an input connection of the second stage (8) are connected. During operation one of the two or more first stages (7a, 7b, 7c) is activated to provide an input signal to the second stage (8).

18 Claims, 4 Drawing Sheets

(51) Int. Cl.
*H04W 28/14* (2009.01)
*H04B 7/08* (2006.01)

(56) References Cited

U.S. PATENT DOCUMENTS

| | | | |
|---|---|---|---|
| 8,923,790 B2 * | 12/2014 | Hsin | H03G 3/20 |
| | | | 375/345 |
| 2003/0190903 A1 | 10/2003 | Melamed | |
| 2013/0002516 A1 * | 1/2013 | Kosuga | H04B 7/0805 |
| | | | 343/876 |

OTHER PUBLICATIONS

International Search Report, dated Sep. 9, 2014, from corresponding PCT Application.

* cited by examiner

COMMON GATE MULTIPLE INPUT LOW NOISE AMPLIFIER

FIELD OF THE INVENTION

The present invention relates to an antenna diversity integrated circuit comprising two or more RF input connections (for connecting an antenna), and a low noise amplifier circuit.

PRIOR ART

U.S. Pat. No. 7,970,367 discloses a system for a dual diversity receiver using switched low-noise amplifiers (LNA). The receiver comprises logic circuits to determine which antenna input signal by the respective LNA is to be used for further processing by the receiver. The implementation disclosed herein is a common source stage that needs inductors at its input for proper matching. When implementing such a diversity receiver in a single integrated circuit, such an implementation would thus require a large integrated circuit area. Also in this implementation one of the two LNA stages is selected by removing the gate bias. As a result, switching is relatively slow, as each time a different LNA is selected, a charge on transistor gate capacitances needs to be built up.

International patent publication WO2009/093892 discloses a diversity receiver, wherein one of two antenna signals is selected for further processing, based on the best signal quality antenna signal. The antenna signal is selected using a multiplexer implementation.

SUMMARY OF THE INVENTION

The present invention seeks to provide an improved implementation of an antenna diversity integrated circuit.

According to the present invention, an antenna diversity integrated circuit according to the preamble defined above is provided, wherein the low noise amplifier circuit comprising a first stage for each one of the two or more RF input connections and a single second stage, wherein output connections of each of the first stages are combined in a single summing node to which an inductor and an input connection of the second stage are connected, and wherein during operation one of the two or more first stages is activated to provide an input signal to the second stage. The inductor acts as a load for selected antenna input and as a compensation of parasitic capacitance at each output of non-selected first stages, providing an improved and easy to realize implementation of an antenna diversity integrated circuit.

In one embodiment, the inductor is a stacked inductor, which allows to further minimize the integrated circuit footprint. As an alternative, the inductor comprises low-resistivity metal layers, which allows to provide an even enhanced quality factor Q.

The two or more first stages of the low noise amplifier have a common-gate LNA topology in an even further embodiment, allowing to even further minimize area use in the integrated circuit, as no on-chip inductors are needed for input matching in this implementation.

In a further embodiment, the common-gate LNA topology comprises input stage transistor gates with an oxide thickness adapted for an operating voltage of the antenna diversity integrated circuit. A thin oxide is used for e.g. 1.2V applications, and a thick oxide for 3.0V applications.

Each of the first stages comprises a buffered output stage, an antenna input stage and a current source stage in a further embodiment, and the buffered output stage and antenna input stage of each of the two or more first stages are continuously biased in operation. One of the two or more first stages is selected by activating the associated current source stage only. This provides for a very efficient switching scheme for the antenna diversity integrated circuit. In a further embodiment, activating the associated current source stage is implemented using a constant-gm biasing circuit. The constant-gm biasing circuit comprises a current mirror in a further embodiment having transistors which are scaled versions of transistors in the two or more first stages of the low noise amplifier. This allows to keep all processing parameters for the transistors involved the same or at least similar, making the integrated circuit independent of various types of environmental parameters. In an even further embodiment, the buffered output stage comprises a cascode circuit, which provides for an efficient implementation for obtaining sufficient isolation between each antenna during operation.

In an even further aspect, the present invention relates to a transceiver comprising an antenna diversity integrated circuit according to any one of the present invention embodiments. The transceiver may even be implemented as a fully integrated circuit transceiver, of which the antenna diversity integrated circuit is a part.

SHORT DESCRIPTION OF DRAWINGS

The present invention will be discussed in more detail below, using a number of exemplary embodiments, with reference to the attached drawings, in which FIGS. 1a and 1b show diagrams of prior art antenna diversity circuits;

DETAILED DESCRIPTION OF EXEMPLARY EMBODIMENTS

The disclosed invention embodiments as described below have particular application in the field of ultra-low power sensor networks, but are also applicable for any wireless application that uses antenna diversity and is constrained by a power budget and cost.

Sensor nodes are often required to be operational on a coin-cell battery for several years or even use energy scavenging and thus use no batteries, which requires an ultra-low power implementation. Furthermore, the total cost of the sensor node should be very low, as hundreds or more nodes are envisioned in each home or use case. The cost of the sensor node is usually proportional to the amount of silicon area of the integrated circuit in combination with the chosen process technology and the amount of discrete components needed. Despite all these constraints, the sensor nodes should have a high sensitivity and at the same time be robust against interferers.

Antenna diversity is therefore used to improve the link budget and reliability against interferers. With multi-path fading conditions, a link budget improvement of 10 dB can be expected from a two antennae system with an antenna diversity circuit. The advantages of antenna diversity are well known in the art.

Figure 1A:
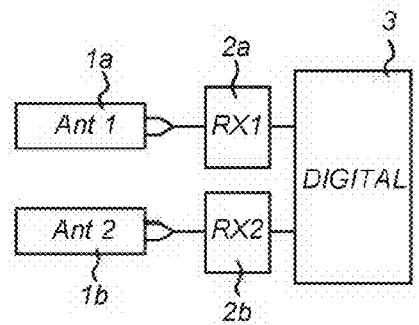
Figure 1B:
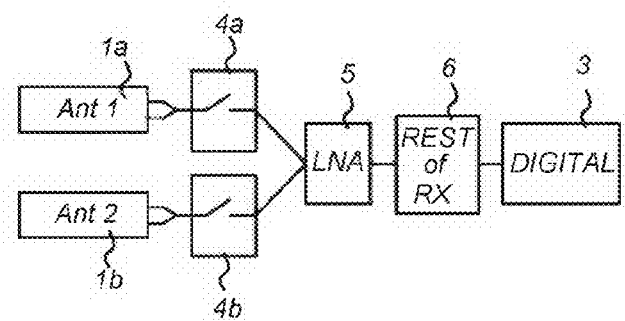

A very simple implementation of antenna diversity is shown in the block diagram of FIG. 1a. An entire analogue receiver chain 2a, 2b is needed for each antenna 1a, 1b. Digital post-processing 3 then determines the optimal antenna 1a, 1b. Note that the area and power penalty is quite severe. FIG. 1b shows a further prior art implementation, wherein antenna diversity is achieved with switches 4a, 4b. However, this introduces a penalty in terms of performance, due to the switch insertion-loss. One of the switches 4a, 4b is conducting, thereby providing an input signal from one of the antennas 1a, 1b to a low noise amplifier 5 (LNA), followed by a further part of the receiver 6 and the digital processing part 3.

One condition for a better receiver performance with antenna diversity is that the individual antenna signals are uncorrelated. Isolation between the antennas is an important design criterion. Another important aspect of antenna diversity, is the selection mechanism that is implemented. For a packet-based radio system like ZigBee (often used for wireless sensor networks) the determination of the best antenna is executed during the reception of the preamble of the packet. The best antenna selection can be based on the strongest signal, signal-to-noise ratio, signal-to-interference ratio, signal quality and/or a combination of these. With ZigBee, the preamble duration of eight symbol-intervals corresponds to 128 µsec. However, the selection of the optimal antenna is often based on one or a few symbol-intervals each having a duration of 16 µsec and the amount of symbol-intervals per antenna is already reduced due to the antenna diversity. Fast switching between antennas is necessary to avoid degradation by an undefined signal part within such a 16 µsec period as used for the antenna selection.

Better receiver performance with antenna diversity can also be achieved by minimizing insertion loss, often introduced by parasitic capacitances or finite on-resistance of a diversity switch. Insertion loss can be described with a noise figure proportional to the amount of loss. The impact of the insertion loss on the noise figure of the total receiver can be described by the Friis' formula, which is known in the art. This formula shows that any insertion loss directly after the antenna (before amplification) will contribute directly to the receiver noise figure. When implementing antenna diversity with a switch before the LNA, the noise figure of the receiving system will be degraded significantly compared to a non-diversity system due to and corresponding to the insertion loss. An implementation that uses a switch after the LNA will already benefit from the gain of the LNA, because it will reduce the contribution of the insertion loss to the complete receiver. For example, the receiver noise figure degradation by an insertion loss of say 1 dB would be reduced from 1 dB to 0.1 dB with a LNA gain of 10 dB. However, the additionally introduced capacitive loading by a switch after the LNA should be taken into account during the LNA design. Implementing the switch even further down in the receiver chain either increases the area, complexity or power consumption which is unwanted.

The present invention embodiments do not require an actual switch. In the general schematic view shown in FIG. 2, a three antenna diversity receiver is shown, having three antennas 1a, 1b, 1c which are each connected in operation to respective inputs of first stages 7a, 7b, 7c of the low noise amplifier (LNA). The outputs of each of the three stages 1a, 1b, 1c is connected to a (summing) node, to which also an inductor L is connected. From this node, the receiver implementation comprises a second stage low noise amplifier 8, followed (like the FIG. 1b example) by the further part of the receiver 6 and the digital processing part 3. This implementation does not have the performance penalty associated with the implementation shown in FIG. 1b, but does have similar power and area figures.

Thus, each antenna 1a, 1b, 1c has a LNA part (first stages 7a, 7b, 7c) that can be turned on or off using e.g. current sources (see below), and thus effectively selects the antenna 1a, 1b, 1c. A (stacked) inductor L reduces the insertion loss by mitigating the additional parasitic capacitance introduced at the summing node of the multiple LNA stages 7a, 7b, 7c at the desired RF signal frequency.

A stacked inductor L has the advantage that it is possible to realize such an inductor L in an integrated circuit using well known techniques, and uses a small die area in the integrated circuit. As an alternative, an inductor L using only low-resistivity metal layers can also be implemented, achieving a narrower bandwidth at the cost of more area. Stacked inductors L tune out the capacitance (of the outputs of the first stages 1a, 1b, 1c) while having also a low quality factor Q, making the output selectivity insensitive to component spread, while the resistive part of the stacked inductance L also helps to increase the overall LNA gain.

Because a LNA (first stages 7a, 7b, 7c) is used for each antenna 1a, 1b, 1c, the LNA first stages 7a, 7b, 7c can be switched on/off to select one of the antennas 1a, 1b, 1c. The area penalty in the associated integrated circuit of using a LNA first stage 7a, 7b, 7c for each antenna 1a, 1b, 1c is minimized, by using a common-gate LNA topology, which doesn't require on-chip inductors for matching. The power consumption is similar to an implementation without antenna diversity because only a single LNA 7a, 7b, 7c is powered on at the same time. The (stacked) inductor L has a dual function: it functions as a load for the selected LNA first stage 7a, 7b, 7c and it mitigates the parasitic capacitance introduced at the output of each LNA first stage 7a, 7b, 7c at the desired RF signal frequency.

Figure 2:
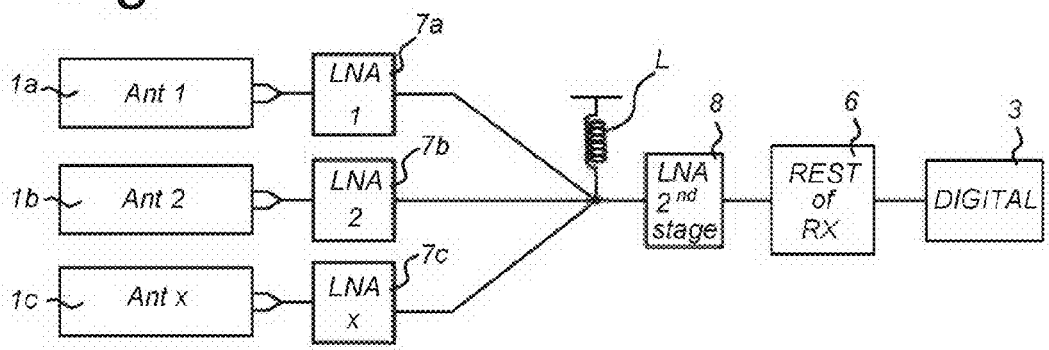
FIG. 2 shows a schematic diagram of an antenna diversity system according to the present invention.
Figure 3:
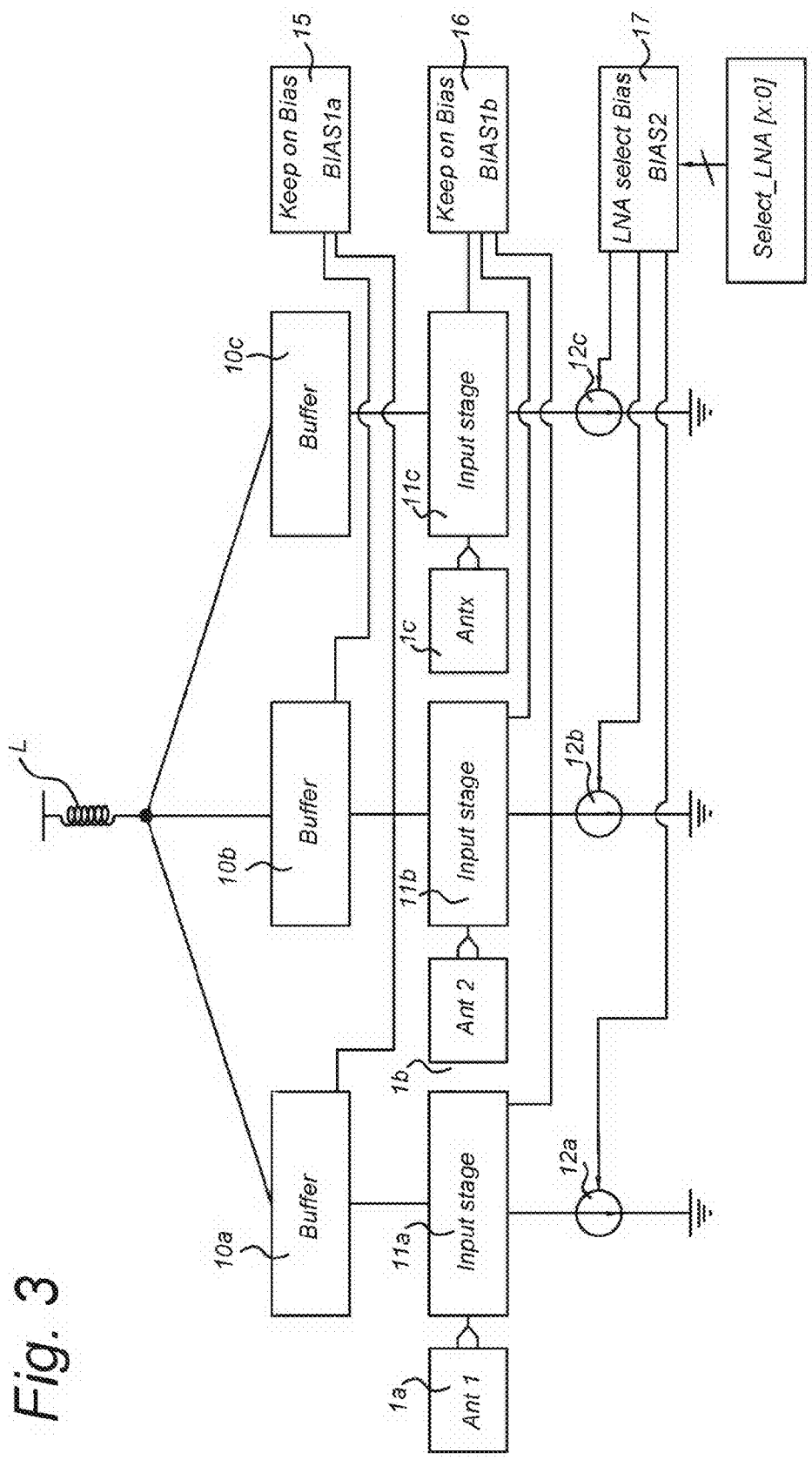
FIG. 3 shows a more detailed schematic diagram of the front end part of the antenna diversity circuit of FIG. 2.

FIG. 3 shows a more detailed schematic diagram of the front end part of the antenna diversity circuit of FIG. 2, and illustrates how the invention embodiment can be easily extended to three or even more input stages 7a, 7b, 7c. The antennas 1a, 1b, 1c that can be connected to the diversity circuit are shown as blocks Ant 1, Ant 2 and Ant x, connected to respective signal inputs of antenna input stages 11a, 11b, 11c. The outputs of the antenna input stages 11a, 11b, 11c are connected to buffer stages 10a, 10b, 10c, respectively. The outputs of the buffer stages 10a, 10b, 10c are connected to the summing node, to which also the stacked inductor L is connected, and which serves as input to a remaining part of receiving circuitry (see also FIG. 2 above). Current supply to the input stages 11a, 11b, 11c is provided by a single current source 12a, 12b, 12c for each of the input stages 11a, 11b, 11c. The output buffer stages 10a, 10b, 10c can e.g. be implemented using cascode devices, which as such are well known to the skilled person.

Part of the input stages 7a, 7b, 7c, i.e. the antenna input stages 11a, 11b, 11c and the buffer stages 10a, 10b, 10c, are kept operational using a keep-on bias supply. In the embodiment shown in FIG. 3, this is implemented using a first bias unit 15 connected to the buffer stages 10a, 10b, 10c and a second bias unit 16 connected to the antenna input stages 11a, 11b, 11c.

The current sources 12a, 12b, 12c are controlled using a selection bias unit 17, using a control signal ('Select_LNA '[x:0]' shown in FIG. 3 as input signal to the selection bias unit 17, wherein 'x' represents the number of LNA's minus one.

Antenna selection is thus implemented by switching the current to the intended antenna input stage (e.g. antenna input stage 11a) while cutting the current to the other antenna input stages (then antenna input stages 11b and 11c). The bias for the entire first stages 7a, 7b, 7c is split up in a so-called 'Keep-on' part (first and second bias units 15, 16) and 'Select-LNA' part (selection bias unit 17). The keep-on bias parts 15, 16, as the name implies, are kept on regardless of which LNA first stage 7a, 7b, 7c is selected. Hence a sufficient filtering of the bias voltage can be applied to maintain the low noise properties of the Low Noise Amplifier, while not affecting the diversity switching speed (as nothing is being switched for this bias).

Figure 4:
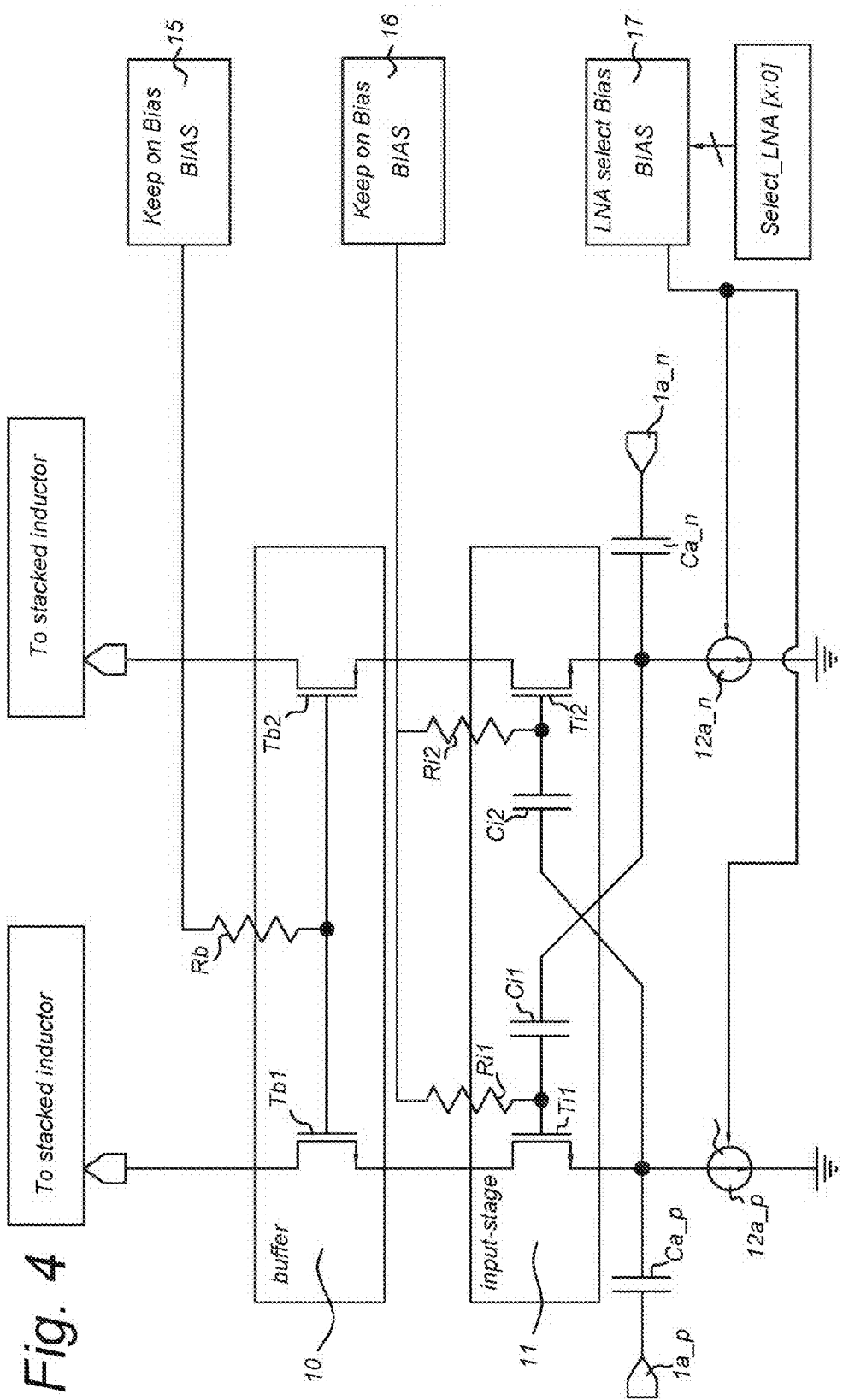
FIG. 4 shows a further embodiment of an antenna diversity circuit according to the present invention.

FIG. 4 shows a possible (differential) implementation embodiment of the present invention, using two antenna inputs 1a_p, 1a_n which are connected to the antenna input stage 11 via coupling capacitors Ca_p and Ca_n (a differential antenna signal input). Diversity is implemented by turning the current sources 12a_p, 12a_n on or off while the antenna input stage 11 and buffer stage 10 are biased continuously. This allows for fast switching and simultaneously sufficient isolation between this antenna 1a and further antennas 1b, 1c.

The buffer stage 10 in this embodiment is implemented as a cascode circuit with two transistors Tb1 and Tb2, and the bias current is applied from the first bias unit 15 to the gates of the transistors Tb1 and Tb2 via resistor Rb. The respective outputs of the buffer stage 10 are connected to the stacked inductors L (differential circuit) as indicated.

The antenna input stage 11 is implemented using two transistors Ti1 and Ti2, and the bias input is provided from the second bias unit 16 via two respective resistors Ri1 and Ri2 to the gates of the transistors Ti1 and Ti2. The differential input signals of the antenna 1a_p, 1a_n are also cross coupled using the capacitors Ci1 and Ci2 (achieving gm-boosting for the antenna input stage 11).

The selection bias unit 17 is in this embodiment implemented as a constant-gm biasing circuit, and is used to generate a current that is proportional to a resistor using a current mirror with transistors that are a scaled version of the input-stage transistors Ti1 and Ti2. This current is copied to the current sources 12a_p, 12a_n shown in FIG. 4. This ensures that the input-stage transistors Ti1, Ti2 also have a gm (which determines voltage gain) that is constant over temperature, process, supply voltage and a robust input match is obtained. The voltage gain of the common-gate LNA implementation in antenna input stage 11 is now given as gm*Zload, where Zload is implemented with the stacked inductors L.

Depending on the operating voltage of the integrated circuit wherein the antenna diversity circuit is realized, the input stage transistors Ti1, Ti2 can be provided with thin (low voltage) or thick (high voltage) oxide input stages.

Figure 5:
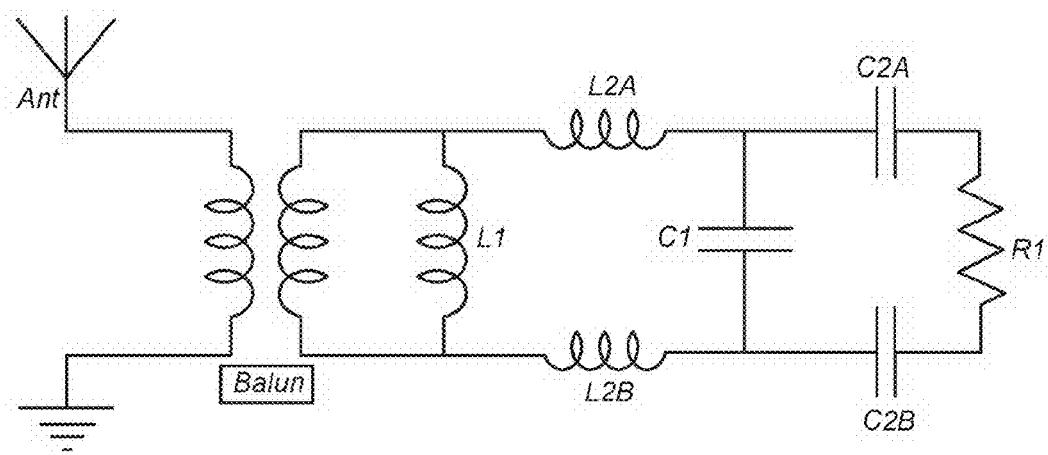
FIG. 5 shows a simplified equivalent matching example for illustration purposes.

FIG. 5 shows a simplified example of how a single antenna could be matched to a common-gate LNA stage, as used in the embodiment shown in FIG. 3. Looking from the antenna side, a balun is used to convert the single-ended signal to a differential signal. L1 represents a discrete inductor, L2A and L2B represent the bond-wires connecting the package to the die of the integrated circuit, C1 represents on-chip parasitics, C2A and C2B represent on-chip coupling capacitors and R1 represents the common-gate LNA input stage, as used in the implementation of input stages 7a, 7b, 7c of FIG. 2.

Bond-wires L2A and L2B are assumed to be dependent on the bonding process. C1 is usually determined by routing and depends on the chosen LNA and subsequent power amplifier (PA) design. However, L1, C2A and C2B are much less constrained and can be used to optimize the matching. R1 is given as 1/gm of the common-gate transistors Ti1, Ti2. This choice of gm is a trade-off between gain, matching, noise figure and current consumption of the LNA.

The embodiments described above, in a dual or multiple-input LNA implementation, in general wording comprise multiple first stages 7a, 7b, 7c which allows for implementation of a diversity transceiver without a diversity switch. By turning the respective LNA first stage 7a, 7b, 7c on or off, the same functionality as a diversity switch can be achieved, however the receiver sensitivity of the diversity transceiver is improved by eliminating the insertion loss which is associated with any switch. The identical first stages 7a, 7b, 7c are common-gate stages that are used to make gain and to provide matching to a well-defined real impedance without the need for on-chip inductors at the input. This eliminates the area associated with those inductors. For ultra low-power transceivers it is imperative to have only one receiver for diversity reception, while having two antenna-inputs. That means that the output of the LNA first stages 7a, 7b, 7c needs to combined. In the embodiments disclosed herein, the first stages 7a, 7b, 7c of the dual-/multiple-input LNA are combined by area efficient stacked inductors L, such that capacitances of the first stages 7a, 7b, 7c and the input capacitance of following stages (second stage 8) is tuned out. The combination of the two/multiple common-gate LNA-stages 7a, 7b, 7c merging together via stacked inductors L creates a novel ultra low-power and ultra-low IC-area diversity input stage for diversity transceivers. Optimum isolation between the two/multiple LNA inputs is obtained by adding buffers, for example implemented by cascode (configuration circuit) devices as described above with reference to FIG. 4, before they are merged together using stacked inductors L.

Especially when using the present invention embodiments of the antenna diversity circuit with a dual transmitter stage to form a switchless diversity transceiver system, advantages with respect to known systems become clear.

The matching for the present invention embodiments can be compared to an example where the diversity switch is implemented on-chip (i.e. the circuit diagram shown in FIG. 1b). The element L1 in FIG. 5 is an inductor used to compensate the on-chip parasitic capacitances. When using an on-chip diversity switch, the amount of parasitic capacitance is different for the receive (RX) and the transmit (TX) modes. Some performance will need to be sacrificed to obtain a correct match, when using an on-chip diversity switch. For the case of the present invention embodiments, the amount of parasitic capacitance is similar for both RX and TX mode.

Furthermore, the optimum bias scheme as disclosed above allows for maximum switching speed between the first LNA stages 7a, 7b, 7c and the second LNA stage 8, to allow proper operation with many diversity algorithms. By switching both stages 7a, 7b, 7c, 8 off, the LNA represents a high impedance, such that a power amplifier (PA) in a transmitter mode can use the same RF connections to the antennas 1a, 1b, 1c as the LNA first stage inputs, allowing the construction of a transceiver with the dual-input common-gate LNA, without any circuit addition.

In view of the above, it is clear that the disclosed invention embodiments offer a new way of implementing antenna diversity which minimizes the cost of implementation while at the same time achieving good performance due to the absence of insertion loss, proper isolation between antennas and fast switching speeds.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. An antenna diversity integrated circuit comprising two or more RF input connections for connecting an antenna,
   a low noise amplifier circuit comprising a first stage for each one of the two or more RF input connections and a single second stage,
   wherein output connections of each of the first stages are combined in a single summing node to which an inductor and an input connection of the second stage are connected,
   and wherein during operation one of the two or more first stages is activated to provide an input signal to the second stage.

2. The antenna diversity integrated circuit of claim 1, wherein the inductor is a stacked inductor.

3. The antenna diversity integrated circuit of claim 1, wherein the inductor comprises low-resistivity metal layers.

4. The antenna diversity integrated circuit of claim 1, wherein the two or more first stages of the low noise amplifier have a common-gate LNA topology.

5. The antenna diversity integrated circuit of claim 4, wherein the common-gate LNA topology comprises input stage transistor gates with an oxide thickness adapted for an operating voltage of the antenna diversity integrated circuit.

6. The antenna diversity integrated circuit of claim 1, wherein each of the first stages comprises a buffered output stage, an antenna input stage and a current source stage,
   the buffered output stage and antenna input stage of each of the two or more first stages being continuously biased in operation, and wherein one of the two or more first stages is selected by activating the associated current source stage only.

7. The antenna diversity integrated circuit of claim 6, wherein activating the associated current source stage is implemented using a constant-gm biasing circuit.

8. The antenna diversity integrated circuit of claim 7, wherein the constant-gm biasing circuit comprises a current mirror having transistors which are scaled versions of transistors in the two or more first stages of the low noise amplifier.

9. The antenna diversity integrated circuit of claim 6, wherein the buffered output stage comprises a cascode circuit.

10. Transceiver comprising an antenna diversity integrated circuit with
    two or more RF input connections for connecting an antenna,
    a low noise amplifier circuit comprising a first stage for each one of the two or more RF input connections and a single second stage,
    wherein output connections of each of the first stages are combined in a single summing node to which an inductor and an input connection of the second stage are connected,
    and wherein during operation one of the two or more first stages is activated to provide an input signal to the second stage.

11. The transceiver of claim 10, wherein the inductor is a stacked inductor.

12. The transceiver of claim 10, wherein the inductor comprises low-resistivity metal layers.

13. The transceiver of claim 10, wherein the two or more first stages of the low noise amplifier have a common-gate LNA topology.

14. The transceiver of claim 13, wherein the common-gate LNA topology comprises input stage transistor gates with an oxide thickness adapted for an operating voltage of the antenna diversity integrated circuit.

15. The transceiver of claim 10, wherein each of the first stages comprises a buffered output stage, an antenna input stage and a current source stage,
    the buffered output stage and antenna input stage of each of the two or more first stages being continuously biased in operation, and wherein one of the two or more first stages is selected by activating the associated current source stage only.

16. The transceiver of claim 15, wherein activating the associated current source stage is implemented using a constant-gm biasing circuit.

17. The transceiver of claim 16, wherein the constant-gm biasing circuit comprises a current mirror having transistors which are scaled versions of transistors in the two or more first stages of the low noise amplifier.

18. The transceiver of claim 15, wherein the buffered output stage comprises a cascode circuit.

* * * * *